United States Patent [19]

Dumbaugh, Jr.

[11] 4,394,453
[45] Jul. 19, 1983

[54] ENVELOPES FOR TUNGSTEN-HALOGEN LAMPS

[75] Inventor: William H. Dumbaugh, Jr., Painted Post, N.Y.

[73] Assignee: Corning Glass Works, Corning, N.Y.

[21] Appl. No.: 299,737

[22] Filed: Sep. 8, 1981

[51] Int. Cl.³ .............................................. C03C 3/08
[52] U.S. Cl. .................................................... 501/66
[58] Field of Search ........................... 313/221; 501/66

[56] References Cited

U.S. PATENT DOCUMENTS

| | | | |
|---|---|---|---|
| 3,496,401 | 2/1970 | Dumbaugh, Jr. ..................... | 501/66 |
| 3,798,491 | 3/1974 | Molm .................................... | 313/221 |
| 3,978,362 | 8/1976 | Dumbaugh, Jr. et al. ........... | 501/70 |
| 4,060,423 | 11/1977 | Thomas ................................ | 501/70 |
| 4,255,198 | 3/1981 | Danielson et al. ................... | 501/70 |
| 4,302,250 | 11/1981 | Danielson ............................ | 501/70 |

FOREIGN PATENT DOCUMENTS

| | | | |
|---|---|---|---|
| 19850 | 12/1980 | European Pat. Off. ............. | 501/66 |
| 2060602A | 5/1981 | United Kingdom ................. | 501/70 |

*Primary Examiner*—Mark Bell
*Attorney, Agent, or Firm*—C. S. Janes, Jr.

[57] ABSTRACT

The present invention is directed to glasses especially suitable as envelopes for tungsten-halogen lamps. The glasses exhibit strain points of at least about 670° C., a coefficient of thermal expansion (0°–300° C.) of $42\text{–}45 \times 10^{-7}/°C.$ and can be readily melted and shaped utilizing conventional glass melting and high speed tube drawing processes. The glasses consist essentially, in weight percent, of

| | |
|---|---|
| $SiO_2$ | 60.0 ± 1.5 |
| $Al_2O_3$ | 17.0 ± 1.0 |
| $B_2O_3$ | 5.0 ± 0.8 |
| CaO | 11.4 ± 0.8 |
| MgO | 7.5 ± 0.8 |

2 Claims, No Drawings

ENVELOPES FOR TUNGSTEN-HALOGEN LAMPS

BACKGROUND OF THE INVENTION

Tungsten-halogen lamps have been utilized in the European automotive industry for a number of years and have begun to penetrate the United States automotive market during the past few years. Such lamps display several practical advantages, when compared with conventional sealed beam lamps: (1) the light emitted is whiter than that produced by the conventional lamp; (2) the tungsten-halogen lamp can be of much smaller size than the conventional lamp while producing equivalent and even greater amount of light; (3) the intensity of the illumination remains essentially constant throughout the life of the tungsten-halogen lamp; and (4) the tungsten-halogen lamp demonstrates a substantially longer working life than the conventional incandescent lamp.

Nevertheless, because the tungsten-halogen lamps operate at much higher temperatures than the standard lamp, e.g., temperatures in localized areas may range between 500°–700° C., glasses useful as envelopes for such lamps must be thermally stable and resist thermal deformation at those temperatures. Envelopes have been prepared from fused quartz and 96% silica glass compositions since those materials exhibit strain points far in excess of lamp operating temperatures. Disadvantageously however, those materials are quite expensive and are not readily adaptable to standard mass production techniques. Moreover, those glasses are difficult to form and lampwork and, because of their very low coefficients of thermal expansion, demand special sealing procedures to introduce the lead wires into the lamps.

Therefore, considerable research has been undertaken to provide glasses exhibiting melting and forming characteristics operable in the mass production of lamp envelopes while concurrently manifesting the physical properties required for that use. This composition research has principally involved glasses in the alkaline earth aluminosilicate system. To illustrate:

U.S. Pat. No. 3,496,401 is directed to glasses specifically formulated for use as envelopes in tungsten-iodine incandescent lamps. The glasses exhibit coefficients of thermal expansion of $30-50 \times 10^{-7}/°C$., have strain points in excess of 500° C., and consist essentially, expressed in weight percent on the oxide basis, of 55–70% $SiO_2$, 13–25% $Al_2O_3$, 10–25% alkaline earth metal oxide, and 0–10% $B_2O_3$. Alkali metal oxides will desirably be absent, but in no event will the total thereof exceed 0.1%. The preferred glasses contain BaO and are free from $B_2O_3$.

U.S. Pat. No. 3,798,491 is drawn to the fabrication of tungsten-halogen lamps having glass envelopes consisting essentially, expressed in weight percent on the oxide basis, of 59–70% $SiO_2$, 10–20% $Al_2O_3$, and 7.4–28% BaO. The glass demonstrates a coefficient of thermal expansion of $36-40 \times 10^{-7}/°C$.

U.S. Pat. No. 3,978,362 is concerned with glass envelopes for tungsten-bromine lamps consisting essentially, expressed in weight percent on the oxide basis, of 58–63% $SiO_2$, 13–16% $Al_2O_3$, 14–21% CaO, 0–5% MgO, 0–7% BaO, with the total of CaO+MgO+BaO being at least 19%. Alkali metal oxides and $B_2O_3$ are preferably absent. The glasses demonstrate coefficients of thermal expansion of $48-55 \times 10^{-7}/°C$. and strain points in excess of 700° C.

U.S. Pat. No. 4,060,423 describes glass compositions especially suitable for envelopes in tungsten-halogen lamps which manifest liquidus temperatures no greater than 1250° C., strain points of at least 725° C., coefficients of thermal expansion of $42-48 \times 10^{-7}/°C$., and which consist essentially, expressed in weight percent on the oxide basis, of 55–68% $SiO_2$, 15–18% $Al_2O_3$, 7–13% CaO, and 6–16% BaO, along with minor amounts of incidental impurities, residual fluxes, and refining agents. The weight ratio CaO:BaO ranges 0.6:1–1:1. The preferred glass compositions are free from PbO, $B_2O_3$, and alkali metal oxides.

U.S. Pat. No. 4,255,198 discloses glasses for use in tungsten-halogen lamp envelopes displaying strain points in excess of 730° C., liquidus temperatures below 1200° C., liquidus viscosities of at least 40,000 poises, and coefficients of thermal expansion of $43-48 \times 10^{-7}/°C$. which consist essentially, expressed in weight percent on the oxide basis, of 62–64% $SiO_2$, 14–16% $Al_2O_3$, 10–13% CaO, and 7–9% SrO. Alkali metal oxides should be avoided and up to 5% MgO and/or BaO may be tolerated.

United States Application Ser. No. 184,764, now U.S. Pat. No. 4,302,250 filed Sept. 8, 1980 by Paul S. Danielson and entitled "Glass Envelopes for Tungsten-Halogen Lamps", includes glass compositions designed for use as glass envelopes in tungsten-halogen lamps exhibiting strain points in excess of 750° C., liquidus temperatures less than 1300° C., liquidus viscosities of at least 40,000 poises, viscosities of less than 1000 poises at temperatures no higher than 1520° C., and coefficients of thermal expansion of $42-44 \times 10^{-7}/°C$. which consist essentially, expressed in weight percent on the oxide basis, of 64–68% $SiO_2$, 11–14% CaO, 16.5–18.5% $Al_2O_3$, and 3–6% SrO+BaO, consisting of 0–4% SrO and 0–5% BaO. The molar ratio SrO:BaO ranges from 2:1–1:2.

European Patent Application No. 0019850, filed May 21, 1980 by Tokyo Shibaura Denki Kabushiki Kaisha, claiming priority of May 24, 1979, under the title "Halogen Incandescent Lamp" and published Dec. 10, 1980, encompasses glass compositions suitable for tungsten-halogen lamp envelopes which demonstrate strain points of at least 675° C., coefficients of thermal expansion of $41-48 \times 10^{-7}/°C$., and consist essentially, expressed in weight percent on the oxide basis, of 55–65% $SiO_2$, 15–22% $Al_2O_3$, 5–10% CaO, 6–10% MgO, and 3–6% $B_2O_3$ plus very small amounts of accompanying oxides, residual fluxes, and residual clarifying agents. The single working example provided consisted of 57% $SiO_2$, 20% $Al_2O_3$, 6% CaO, 8% MgO, and 4% $B_2O_3$, the total of those components being 95%.

U.K. Patent Application No. GB 2,060,602A, filed Oct. 8, 1980 by Carl-Zeiss Stiftung, claiming priority of Oct. 11, 1979, under the title "Alkali-free Sealing Glasses for Molybdenum" and published May 7, 1981, describes glass compositions suitable for the fabrication of tungsten-halogen lamps which exhibit transformation temperatures of 775°–810° C. and coefficients of thermal expansion of $46-51 \times 10^{-7}/°C$. The glasses can be made colorless or having a yellow tint via the addition of $CeO_2+TiO_2$ to the base composition. The broadest recited ranges, expressed in weight percent on the oxide basis, were:

| | |
|---|---|
| $SiO_2$ | 57.00–64.00 |
| $Al_2O_3$ | 12.50–16.50 |

-continued

|  | |
|---|---|
| ZrO$_2$ | 1.00–5.50 |
| Al$_2$O$_3$ + ZrO$_2$ | 15.00–19.00 |
| CaO | 11.50–19.20 |
| BaO | 0–6.50 |
| CeO$_2$ | 0–8.00 |
| TiO$_2$ | 0–4.50 |
| CaO + BaO + CeO$_2$ + TiO$_2$ | 18.60–25.70 |
| As$_2$O$_3$ | 0–0.30 |

Unfortunately, each of the above-disclosed glasses manifests certain disadvantages, the principal one being the inherent difficulty experienced in melting and forming the compositions utilizing standard commercial mass production glass shaping techniques. Because tungsten-halogen lamp envelopes are conventionally fabricated from sections of glass tubing, the most desirable glasses will exhibit thermal stability and viscosity parameters amenable to the Vello high speed, tube drawing process.

OBJECTIVE OF THE INVENTION

The primary objective of the instant invention is to provide a glass composition suitable for use in high temperature tungsten-halogen lamps, which can be shaped into tubing utilizing the Vello process, and which demonstrates the following physical characteristics; viz., a coefficient of thermal expansion (0°–300° C.) of 42–45×10$^{-7}$/°C., a strain point of at least 670° C., a liquidus temperature below 1150° C., and a viscosity at the liquidus greater than 2×10$^4$ poises.

SUMMARY OF THE INVENTION

That objective can be achieved utilizing glass compositions consisting essentially, expressed in weight percent on the oxide basis, of

|  | |
|---|---|
| SiO$_2$ | 60.0 ± 1.5 |
| Al$_2$O$_3$ | 17.0 ± 1.0 |
| B$_2$O$_3$ | 5.0 ± 0.8 |
| CaO | 11.4 ± 0.8 |
| MgO | 7.5 ± 0.8 |

The total amount of SiO$_2$+Al$_2$O$_3$ is important in fixing the values of viscosity, strain point, and coefficient of thermal expansion demonstrated by the inventive compositions. In general, for example, a low level of SiO$_2$+Al$_2$O$_3$ results in a glass evidencing a low strain point. In contrast, very high concentrations of SiO$_2$+Al$_2$O$_3$ lead to glasses of such high viscosity as to be very difficult to melt. Consequently, the total SiO$_2$+Al$_2$O$_3$ will be held between about 74.5–78%.

The weight ratio SiO$_2$:Al$_2$O$_3$ exerts a substantive effect upon the liquidus temperature displayed by the inventive glasses. Thus, where the liquidus temperature is too high, the glass cannot be formed into tubing utilizing the Vello process. Therefore, a weight ratio SiO$_2$:Al$_2$O$_3$ between about 3.3–3.8 is demanded.

The weight ratio CaO:MgO is a vital significance with respect to the expansion characteristics of the glasses. Where the ratio exceeds a specified limit, the coefficient of thermal expansion of the inventive compositions will be too high. Conversely, where the ratio is too low, not only will the glasses demonstrate coefficients of thermal expansion below the desired range, but also the liquidus temperature of the glass is raised which can lead to melting problems. Accordingly, the weight ratio CaO:MgO must be maintained within about 1.3–1.8.

Finally, the amount of B$_2$O$_3$ is carefully tailored to impart a sufficiently low viscosity to the glass to effect easy melting thereof, but without raising the expansion of the glass. B$_2$O$_3$ also tends to flatten the viscosity-temperature relationship manifested by the glass. Nevertheless, if the B$_2$O$_3$ level is too high, the strain point of the glass drops to an undesirably low value. Conversely, below a minimum quantity of B$_2$O$_3$, the liquidus temperature rises to an unacceptable level.

For the most ideal lamp operation, the glass will be free from alkali metals, iron, and chloride. None of those materials will be purposely incorporated in the composition. Impurity levels in the batch ingredients must be held below 0.2% alkali metal oxide and 0.04% iron oxide.

The target composition for the most preferred glass, expressed in weight percent on the oxide basis, is

|  | |
|---|---|
| Al$_2$O$_3$ | 17.4 ± 0.2 |
| B$_2$O$_3$ | 4.5 ± 0.1 |
| CaO | 10.9 ± 0.1 |
| MgO | 7.8 ± 0.1 |
| SiO$_2$ | 59.4 (remainder) | and exhibits the following physical properties:

|  | |
|---|---|
| Strain Point | 681° C. |
| Coefficient of Thermal Expansion | 42.9 × 10$^{-7}$/°C. |
| Internal Liquidus | 1126° C. |
| Liquidus Viscosity | 3.8 × 10$^4$ poises |

DESCRIPTION OF PREFERRED EMBODIMENTS

Table I reports several glass compositions, expressed in terms of parts by weight on the oxide basis, which are useful in illustrating the critical compositional parameters that must be observed to produce glasses complying with the desired physical properties. Because the sum of the individual components totals or approximately totals 100, for all practical purposes the recited constituents can be considered to have been recorded in terms of weight percent. The actual batch ingredients can either be oxides or other compounds which, when melted together, will be converted into the desired oxide in the proper proportion. To illustrate, CaCO$_3$ can be employed as a source of CaO.

The batch materials were ballmilled together to assist in achieving a homogeneous melt and then placed into a platinum crucible. The crucible was introduced into a furnace operating at about 1550° C. and maintained therewithin for about 4 hours. Thereafter, the crucible was removed from the furnace, the melt poured into a steel mold to form a glass slab having dimensions of about 6"×6"×½", and this slab transferred immediately to an annealer operating at about 740° C. (Although the reported compositions were melted in laboratory crucibles only, it must be understood that larger melts of the glasses can be undertaken in commercial pots or continuous glass-melting units, where desired.)

TABLE I

|  | 1 | 2 | 3 | 4 | 5 | 6 |
|---|---|---|---|---|---|---|
| SiO$_2$ | 59.4 | 59.6 | 59.2 | 59.2 | 60.9 | 61.4 |
| Al$_2$O$_3$ | 16.5 | 16.5 | 17.4 | 17.8 | 16.0 | 14.6 |

TABLE I-continued

|   | | | | | |
|---|---|---|---|---|---|
| $B_2O_3$ | 4.5 | 5.8 | 4.5 | 4.5 | 4.2 | 4.5 |
| CaO | 11.4 | 11.4 | 11.9 | 11.4 | 11.9 | 11.3 |
| MgO | 8.2 | 6.7 | 7.0 | 7.1 | 7.0 | 8.2 |

|   | 7 | 8 | 9 | 10 | 11 | 12 |
|---|---|---|---|---|---|---|
| $SiO_2$ | 55.3 | 58.7 | 60.1 | 59.7 | 58.4 | 60.5 |
| $Al_2O_3$ | 20.4 | 16.3 | 16.7 | 17.4 | 15.9 | 16.7 |
| $B_2O_3$ | 4.5 | 4.5 | 4.6 | 3.8 | 4.8 | 5.1 |
| CaO | 11.5 | 15.4 | 7.3 | 11.3 | 14.4 | 9.4 |
| MgO | 8.3 | 5.1 | 11.3 | 7.8 | 6.3 | 7.4 |
| $Na_2O$ | — | — | — | — | — | 0.9 |

Table II lists measurements of several physical properties determined on the above-recited exemplary glasses in accordance with techniques conventional in the glass art. The coefficients of thermal expansion were ascertained over the temperature range of 0°–300° C. and are recorded in terms of $\times 10^{-7}/°C$. The strain point and internal liquidus are tabulated in °C., and the viscosity of the glass at the liquidus temperature in poises.

TABLE II

|   | 1 | 2 | 3 | 4 | 5 | 6 |
|---|---|---|---|---|---|---|
| Strain Point | 679 | 676 | 673 | 681 | 677 | 673 |
| Coef. of Exp. | 45 | 43.6 | 42.8 | 42.4 | 43 | 44.7 |
| Liquidus | 1114 | 1146 | 1144 | 1134 | 1149 | 1223 |
| Liq. Viscos. | $3.7 \times 10^4$ | $2.1 \times 10^4$ | $2.2 \times 10^4$ | $3.5 \times 10^4$ | $2.7 \times 10^4$ | $4.7 \times 10^3$ |

|   | 7 | 8 | 9 | 10 | 11 | 12 |
|---|---|---|---|---|---|---|
| Strain Point | 687 | 676 | 687 | 681 | 659 | 667 |
| Coef. of Exp. | 46.3 | 48.2 | 41.8 | 43.6 | 47.7 | 42 |
| Liquidus | 1183 | 1121 | 1203 | 1156 | 1125 | 1133 |
| Liq. Viscos. | $6 \times 10^3$ | $2.3 \times 10^4$ | $6 \times 10^3$ | $1.6 \times 10^4$ | — | $1.9 \times 10^3$ |

The extreme criticality of composition control is dramatically and unqualifiedly demonstrated in the above examples. Hence, Examples 1–5 exhibit the required matrix of physical properties whereas Examples 7–12, having closely similar compositions, but outside the specified ranges of the inventive glasses, do not. Thus, one or more of the cited physical properties thereof is unacceptable for the demanded use of the inventive glass.

I claim:

1. A glass envelope for a tungsten-halogen incandescent lamp, said glass exhibiting a strain point of at least 670° C., a coefficient of thermal expansion (0°–300° C.) of $42$–$45 \times 10^{-7}/°C.$, a liquidus temperature below 1150° C., and a viscosity at the liquidus temperature greater than $2 \times 10^4$ poises, and consisting essentially, expressed in weight percent on the oxide basis, of

|   |   |
|---|---|
| $SiO_2$ | 60.0 ± 1.5 |
| $Al_2O_3$ | 17.0 ± 1.0 |
| $B_2O_3$ | 5.0 ± 0.8 |
| CaO | 11.4 ± 0.8 |
| MgO | 7.5 ± 0.8 | the total $Al_2O_3 + SiO_2$ being held between 74.5–78, the weight ratio $SiO_2:Al_2O_3$ being held between about 3.3–3.8, and the weight ratio CaO:MgO being held between about 1.3–1.8.

2. A glass envelope according to claim 1 consisting essentially of

|   |   |
|---|---|
| $Al_2O_3$ | 17.4 ± 0.2 |
| $B_2O_3$ | 4.5 ± 0.1 |
| CaO | 10.9 ± 0.1 |
| MgO | 7.8 ± 0.1 |
| $SiO_2$ | 59.4 (remainder) |

* * * * *